INVENTORS
CHARLES E. MAKI
JOSEPH M. CHIRNITCH
BY

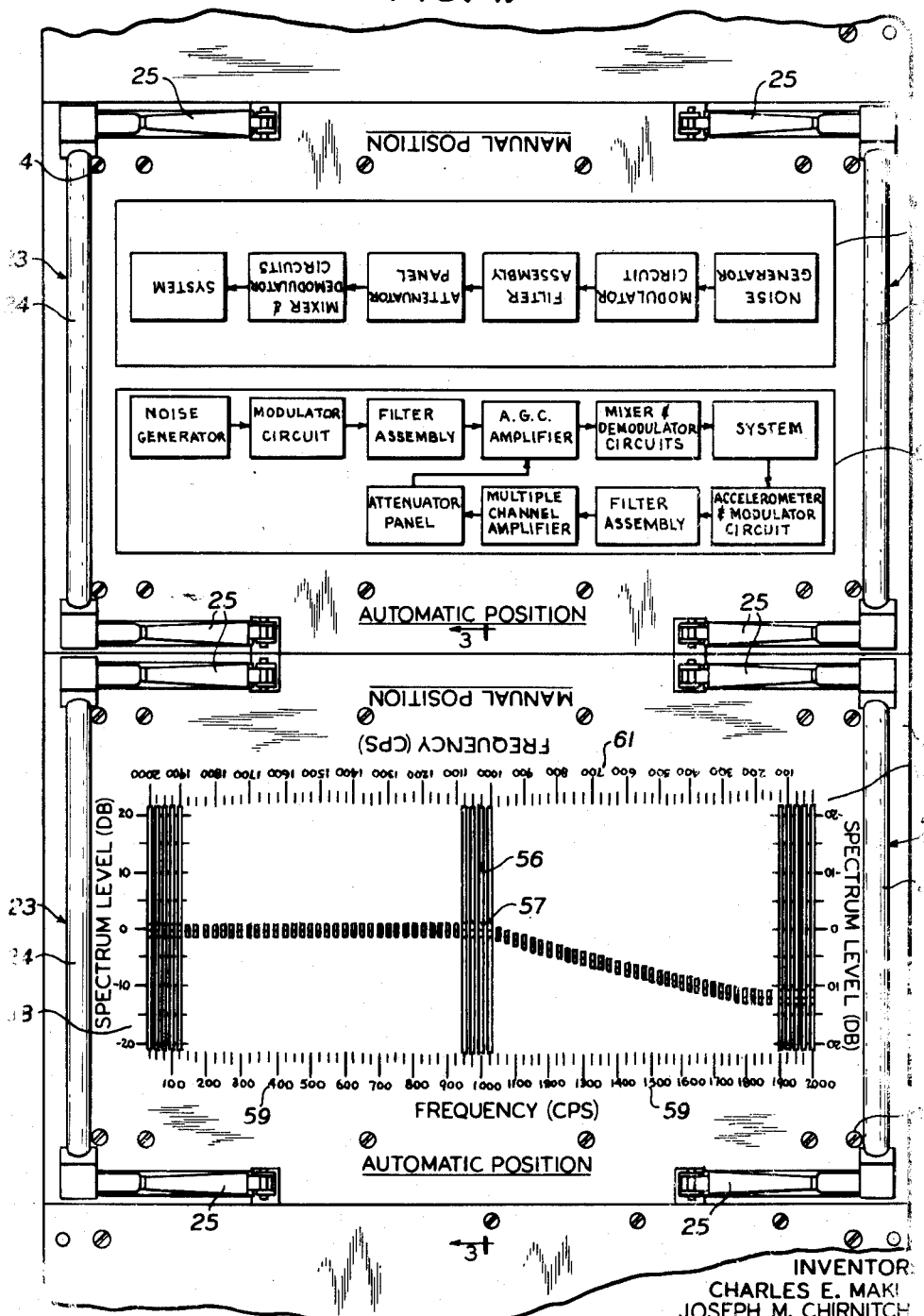

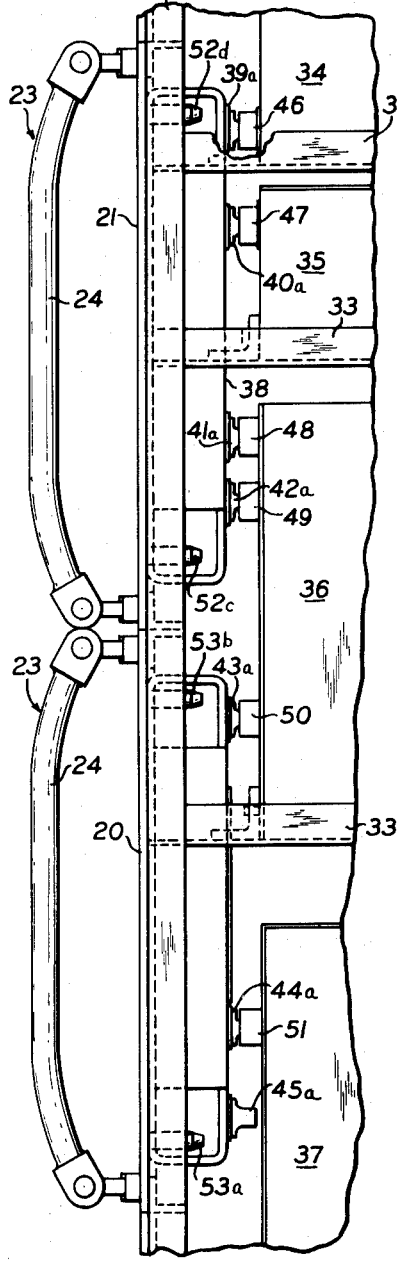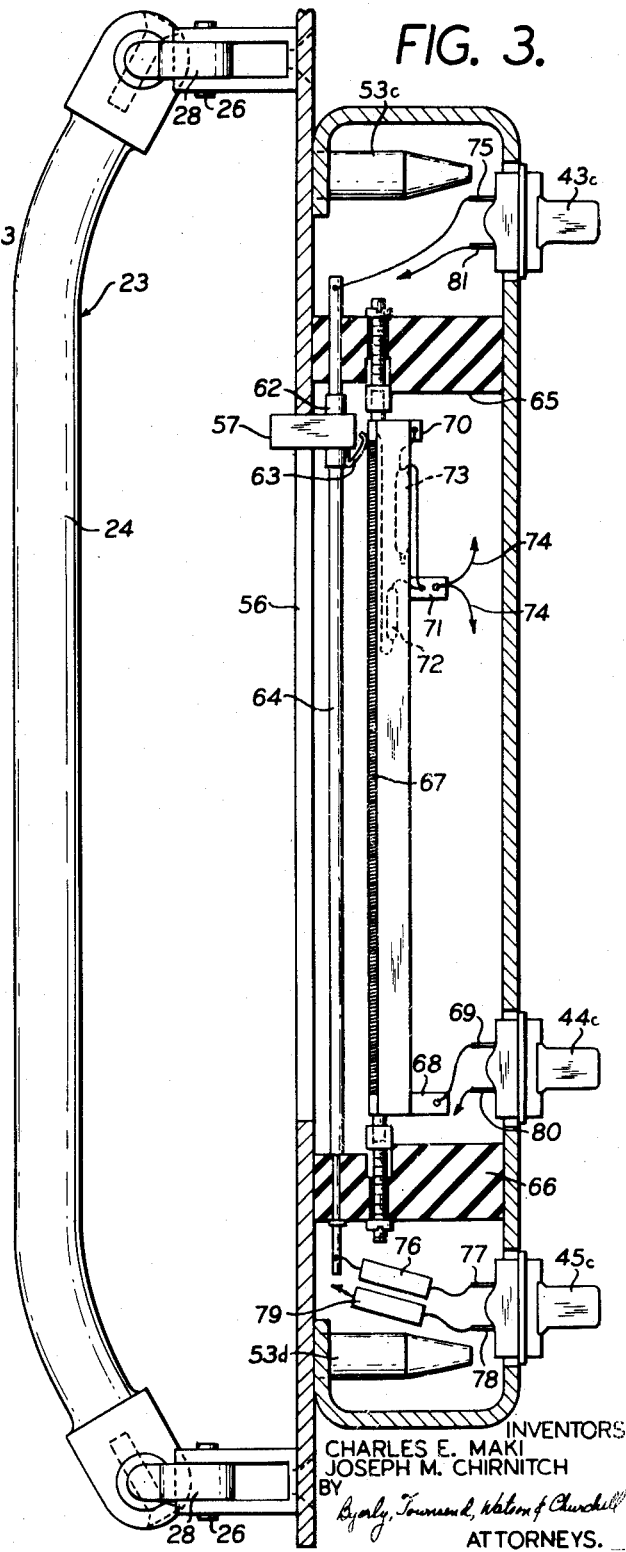

ATTORNEYS.

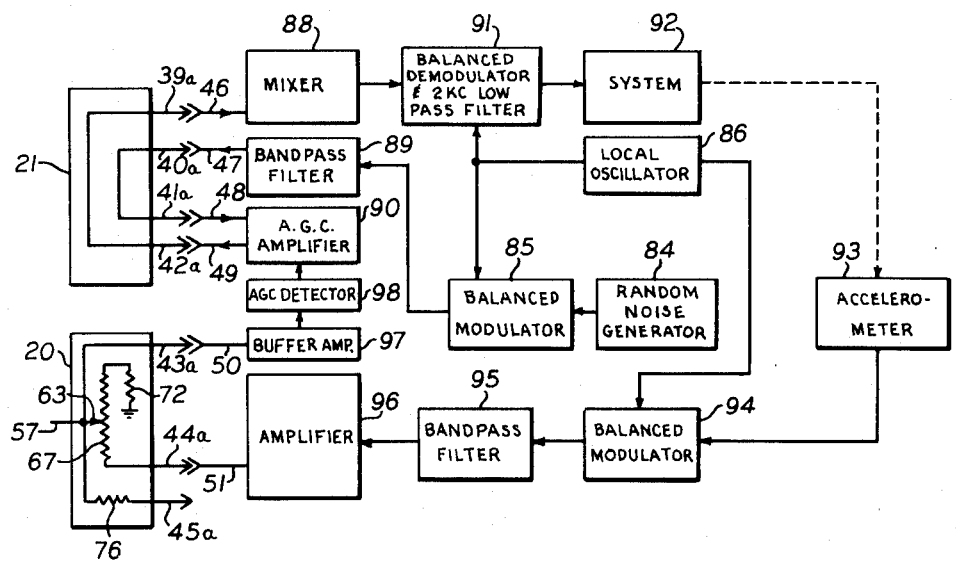
FIG. 9.
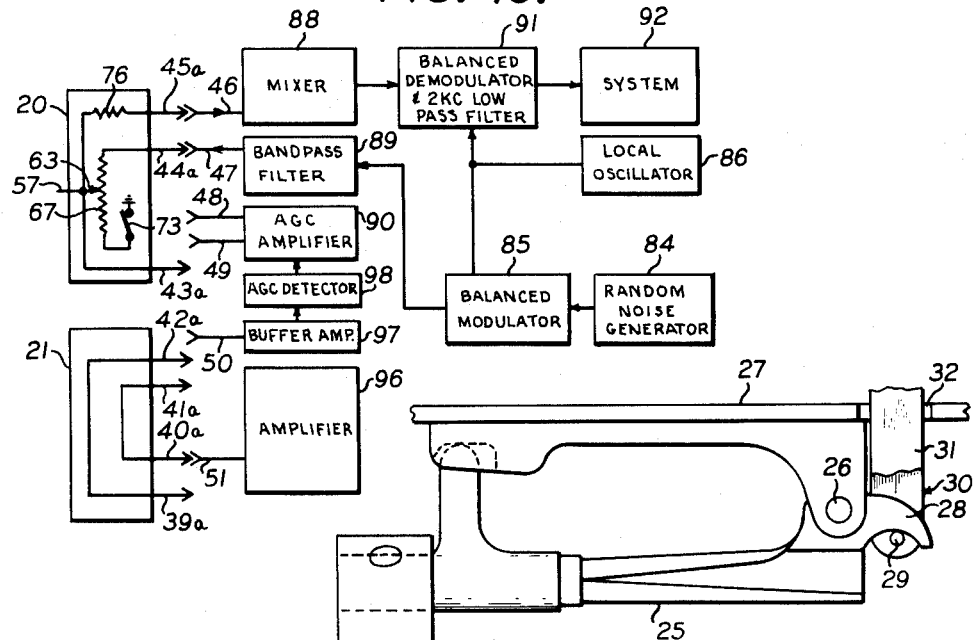
FIG. 10.
FIG. 11.
INVENTORS
CHARLES E. MAKI
JOSEPH M. CHIRNITCH United States Patent Office 3,206,622
Patented Sept. 14, 1965

3,206,622
ELECTRICAL APPARATUS FOR INTERCONNECTING SELECTIVELY ELECTRICAL CIRCUIT COMPONENTS
Charles E. Maki, Minneapolis, Minn., and Joseph N. Chirnitch, New Haven, Conn., assignors to Textron Electronics, Inc., Providence, R.I., a corporation of Delaware
Filed Mar. 8, 1961, Ser. No. 94,371
13 Claims. (Cl. 307—149)

The present invention relates to electrical apparatus and more particularly to apparatus for establishing interconnections between electrical circuit components where circuit switching of the interconnection is required.

Although plug-in panels and the like have been used heretofore, the present invention makes novel use of this technique of achieving conjoint switching of several hundred circuit connections. In addition, by including circuit components in the panel extreme efficiency and economy are achieved.

The invention has many advantages which can be described best with reference to its application to a specific example. For this purpose reference may be had to the copending United States patent application of Charles E. Maki, Serial No. 49,546, filed August 15, 1960. That application deals with vibration testing equipment and particularly with such equipment operating with random noise signals in the audio frequency range.

In a typical testing system an electronic random noise generator drives the system input with a random voltage which is converted by suitable amplifiers and an electromechanical vibration exciter into a mechanical output. Because of resonances in the exciter system and in the test specimen, as well as the requirements of the test specification, it is necessary to provide system equalization as well as other spectral shaping.

The complete system described in the aforesaid application relies on superimposing the random noise signals on a high frequency carrier wave and dividing the resultant wave into 80 adjacent narrow frequency band channels, the signals in the separate channels being independently controlled and then recombined in a mixing circuit for subsequent heterodyne detection to remove the carrier. The detected signal is then used to control the vibration exciter. In order to control the signals in the channels there are provided 80 separate adjustable attenuators. The aforesaid application shows how by the use of ganged switches it is possible selectably to connect the attenuators either in the channels feeding the mixer or in a corresponding set of feedback channels. In the latter case the feedback channels are connected to control corresponding automatic gain control circuits now connected in the channels feeding the mixer. For convenience hereinafter, connection of the components to include the automatic gain control circuits will be referred to as the automatic mode, while connection of the attenuators in the channels feeding the mixer will be referred to as the manual mode.

An object of the present invention is to provide a novel arrangement for accomplishing the switching of the attenuators between the two modes.

A further object of the present invention is to provide adjustable attenuators whose ouput functions are inverted when the aforesaid switching takes place while the direction of adjustment of the actuating element of the attenuators relative to a point in space remains unchanged.

A still further object of the invention is to provide an arrangement for automatically altering the operation of an attenuator when circuit switching takes place.

The invention will be better understood after reading the following detailed description of a presently preferred embodiment thereof with reference to the appended drawings in which:

FIG. 1 is a front elevational view of the plug-in panels in operative position for the automatic mode;

FIG. 2 is an end view of the apparatus of FIG. 1 with the exterior cabinet panel removed and showing particularly the relative relationship of plugs and sockets;

FIG. 3 is an enlarged fragmentary sectional view of the attenuator panel taken along the line 3—3 in FIG. 1 and showing details of construction of one of the adjustable attenuators;

FIG. 9 is a block diagram of the circuit components in the automatic mode;

FIG. 10 is a block diagram of the circuit components in the manual mode; and

FIG. 11 is a fragmentary detailed view on an enlarged scale of the latch mechanism for the plug-in panels.

Throughout the several figures of the drawings the same reference numerals are used to designate the same or similar parts.

Figure 4:
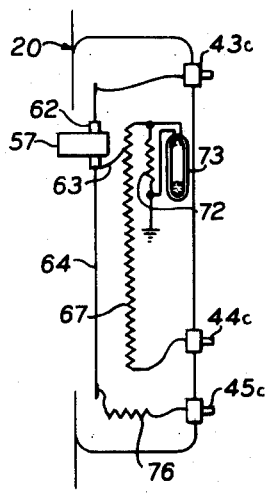
FIG. 4 is a simplified schematic illustration of the structure represented in detail in FIG. 3 for assistance in the explanation thereof.

Reference should now be had to FIGS. 1 and 2 wherein the attenuator panel 20 and patch panel 21 are shown plugged in the automatic mode into receptacles or appropriate spaces in the chassis 22. Each panel is provided with a pair of latch handles, all being identical and designated by the same numeral 23.

For convenience, the details of construction of the latches will be described with reference to the illustration of a single latch in FIG. 11, it being understood that each handle is provided with two such latches connected at opposite ends. The handle grip 24 has an end connected to latch lever 25 which is pivoted at 26 in a yoke secured to the front panel 27 of the plug-in unit. The free end of the lever 25 is provided with a hook extension 28 which is arranged to pass behind a pin 29 secured in a yoke 30 (the upper arm 31 is broken away in part for clarity of illustration). The yoke 30 is carried by the chassis 22 (not shown in FIG. 11) and passes through a notch 32 in the panel 27. To remove a panel the two handles are gripped and pulled forward. This swings the hook end of the latch levers from behind the pins such as 29 and withdraws the panel.

Figure 5:
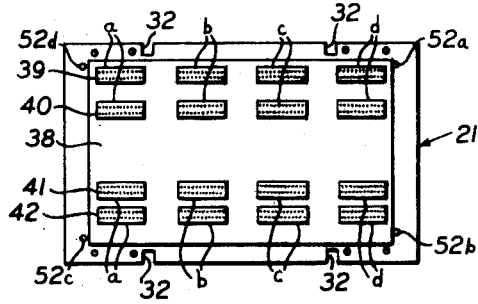
FIG. 5 is a rear elevational view on a reduced scale of the patch panel of FIG. 1 when it is removed from the main chassis.
Figure 6:
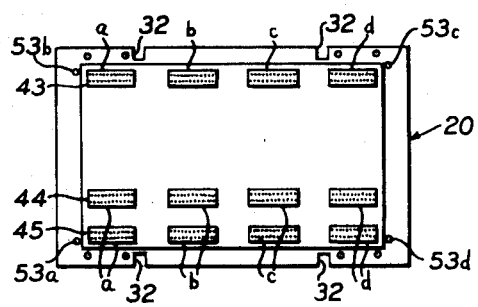
FIG. 6 is a view similar to FIG. 5 but of the attenuator panel.

Referring specifically to FIG. 2, the chassis 22, in known manner, is provided with rails 33 for supporting the sub-assemblies or units 34, 35, 36 and 37 which contain the various electrical components to be described in detail later. In order to effect interconnection of the various components as required, the patch panel 21 is provided on its rear face 38 with a series of four rows of four 24-contact electrical plugs each, as best seen in FIG. 5. The rows are designated respectively by the numbers 39, 40, 41 and 42 with the plugs in each row being further designated by the letters a through d, respectively. In similar manner, the attenuator panel, see FIG. 6, is provided with three rows of four 24-contact plugs designated 43, 44 and 45, a through d, respectively.

Turning back to FIG. 2 it will be seen that in the automatic mode the plugs of row 39 on the patch panel 21 mate with a corresponding row of four sockets on subassembly 34 of which only the first one, 46, is visible in the drawing. Likewise, the plugs of row 40 mate with a row of four sockets on sub-assembly 35 with only socket 47 being visible. Sockets 48 and 49 on sub-assembly 36 each represent a row of four for mating with the plugs in rows 41 and 42 of the patch panel.

Sub-assembly 36 has a further row of four sockets, such as 50, for mating with the plugs of row 43 on the attenuator panel 20. Finally, the sub-assembly 37 is provided with a row of four sockets of which socket 51 is visible and illustrates the mating relationship to the plugs of row 44 on the panel 20. For reasons that will be better understood after reading the rest of this description, the row 45 of plugs on panel 20 is not utilized in the automatic mode.

In order to facilitate understanding of the description to follow it should be noted that each row of plugs or sockets mentioned above represents eighty identical connections for use in the eighty channels found in the specific example under discussion. That is, twenty contacts on each plug or socket, there being four plugs or sockets in each row, go to making up the eighty required. The remaining four contacts on each plug or socket are used for establishing a common ground connection for all of the components.

Figure 8:
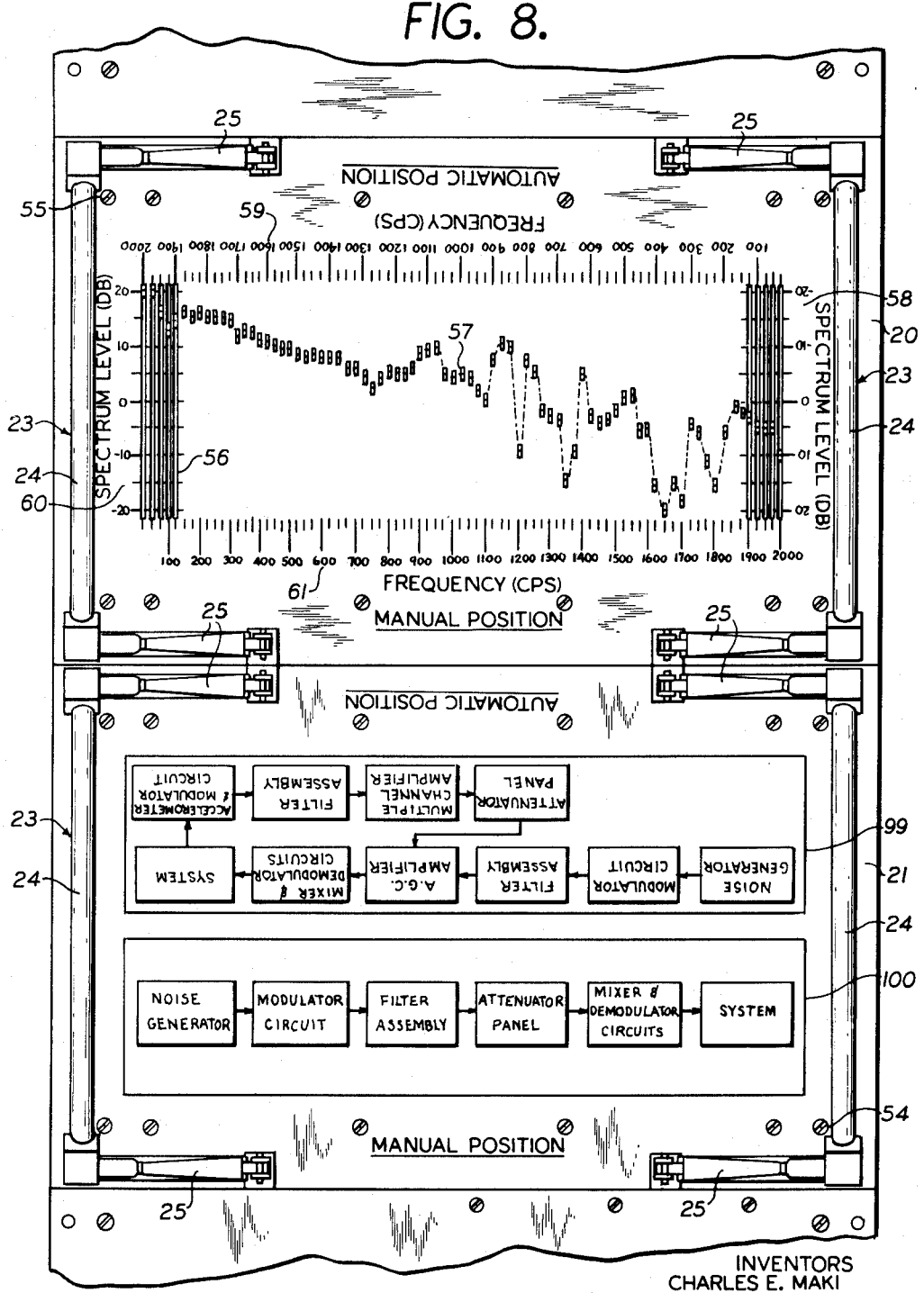
FIG. 8 is a front elevational view of the plug-in panels similar to FIG. 1 but with the panels in position for the manual mode.

In the manual mode, as shown in FIG. 8, the attenuator panel 20 must be interchanged with the patch panel 21, and, at the same time, re-oriented or inverted. As a safety device to prevent insertion of a panel in a given receptacle with the incorrect orientation, the panels are provided with a keying device. This device is best seen in FIGS. 5 and 6 and takes the form of a group of four locator pins, one of which is of different diameter from the other three. Thus, note the pins 52a, 52b, 52c and 52d on panel 21 and 53a, 53b, 53c, and 53d on panel 20. In this example, pins 52a and 53a are each of the same diameter but slightly smaller than the remaining pins. The remaining pins should, between themselves, be of the same diameter. It will be understood that the chassis 22 is provided with apertured members corresponding to the panel pins.

Referring to FIG. 1, the pin 52a is secured to panel 21 behind screw 54. Therefore, the chassis aperture at this location should be slightly reduced in size so as to accept only pins 52a and 53a and reject all others. In similar manner, the pin 53a is located behind screw 55, and the aperture at that location in the chassis is likewise reduced in size.

It should now be clear that the attenuator panel can not be placed in the lower receptacle in the manual position nor in the upper receptacle in the automatic position. The converse applies to the insertion of the patch panel.

The attenuator panel 20 houses the eighty adjustable circuit elements or attenuators. As seen in FIG. 1, the panel front is provided with eighty vertical slots such as slot 56. As a drafting convenience only a representative number of the slots are actually shown. Protruding through the slot 56, and each of the other slots, is a combined indicator and control member 57. That is, the member 57 has a visible reference point inscribed at the middle of its exposed end and is manipulable to adjust the associated attenuator. This will be explained further at a later point in the discussion.

There is a bi-directional scale associated with the slots and control members of the panel 20. The scale is bi-directional in that a graph-like presentation is represented by the relative positions of the control members 57 which is readable with equal facility whether the panel is in the automatic position or inverted to the manual position. That is, the markings along the axis of ordinates 58 and axis of abscissas 59 are readable in the automatic position with upward movement of an indicator 57 representing level change in the positive direction, while the axis of ordinates 60 and axis of abscissas 61 provide the same information in the manual position. For sake of illustration, the indicators 57 in FIG. 1 are shown in an arrangement for establishing circuit operation whereby a specimen is tested at a constant level of excitation from the lowest available frequency up to 1000 c.p.s. and at a progressively decreasing level from 1000 c.p.s. to 2000 c.p.s. with the level falling at a rate of 12 db per octave. This represents a typical test specification.

FIGS. 3 and 4 show both physically and schematically the nature of the adjustable circuit means associated with the indicator and control member 57. It should be understood that throughout the foregoing and ensuing discussion the same reference numerals are used to designate the same or similar parts throughout the several figures of the drawing.

Turning now specifically to FIGS. 3 and 4, it will be seen that the indicator 57 is part of a slider 62 carrying an electrical wiper contact 63 and riding on a conductive rod 64 mounted in insulating headers or supports 65 and 66. The slider 62 makes electrical contact with the rod 64, while the wiper 63 rides in electrical contact along a resistance element 67. The element 67 is also mounted in supports 65 and 66, as shown. One end of the element 67 is connected through a lug 68 and connecting lead to a lug 69 on plug 44c. The other end of the element 67 is connected both to a lug 70 directly and to a lug 71 through a fixed resistor 72. A mercury switch 73 is connected between the lugs 70 and 71, as shown. The switch 73 is oriented, as best seen in FIG. 4, so that its contacts are open when the panel is oriented vertically in the automatic position or mode and closed when the panel is oriented vertically but in the inverted or manual position.

The lug 71 is connected by the leads 74 to the four contacts (not shown) reserved on each of the plugs 43c, 44c, and 45c for establishing the ground connection. The upper end of the rod 64 is connected through lug 75 to a contact on plug 43c, while the lower end of the rod is connected through a resistor 76 to a corresponding lug 77 joined to a contact on plug 45c.

The remaining seventy-nine adjustable elements or potentiometric devices are identical to the one shown in FIG. 3 and are mounted in line in the same supports 65 and 66. The particular 24-contact plug which is used has two rows of contacts of 12 each. For convenience in wiring, adjacent potentiometric devices should alternate between upper and lower plug contacts. Thus, plug lug 78 would be connected through resistor 79 to the lower end of the slide support rod (not shown) of the adjacent control device. In similar manner the adjacent device would have the lower end of its resistance element connected to lug 80 on plug 44c, while its slider rod would be connected to lug 81 on plug 43c.

Figure 7:
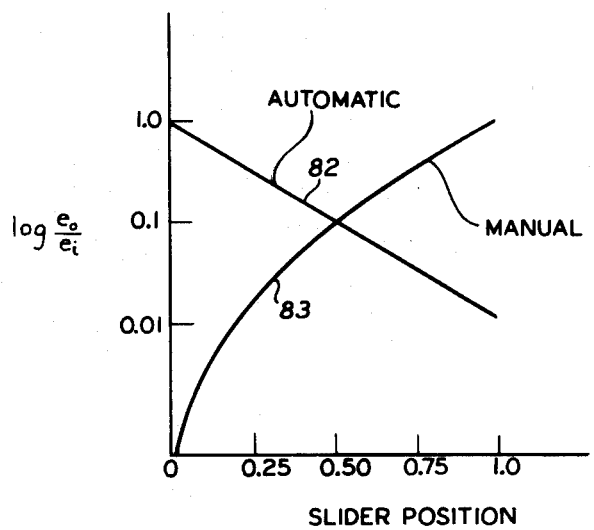
FIG. 7 is a graph of the operating characteristics of a typical attenuator in the attenuator panel.

In the case of the present example, the resistance element 67 of the potentiometric device is constructed, or arranged by the addition of padding resistors, in known manner to have a logarithmic characteristic. Thus, with the mercury switch 73 open so that resistor 72 is interposed between ground and the low potential side of resistance element 67, the output at the slider should follow at least to a reasonable approximation the straight line curve 82 in FIG. 7. The graph is a plot of the function log $e_o/e_i$ where $e_o$ represents the output voltage on the slider relative to ground while $e_i$ represents the input voltage between ground and the high potential side of the logarithmic resistance element. The numerical designations along the axis of ordinates assumes a direct plot of the ratio $e_o/e_i$ on a logarithmic scale. The zero slider position corresponds to the lowermost position or −20 db position in the automatic mode as seen in FIG. 1.

It should now be understood that when the panel 20 is inverted to the manual position, the mercury switch 73 closes so as to shunt resistor 72. This makes it possible to adjust the potentiometric device so as to obtain zero electrical output. That is, the low potential end of the variable resistance element is now connected directly to ground. The output characteristic will now be a modified logarithmic function as shown by the curve 83 in FIG. 7. Zero slider position again corresponds to −20 db, i.e., the lowermost position in the manual mode.

The internal connections in the patch panel 21 are best illustrated schematically in FIGS. 9 and 10. Each of the contacts in the plugs of row 39 are connected, respectively, with the corresponding contact in the plugs of row 42. In the same manner each of the contacts in the plugs of row 40 are connected, respectively, with the corresponding contact in the plugs of row 41.

FIG. 9 represents the electrical interconnection of the components for operation in the automatic mode. A random noise generator 84 provides a test signal output which is superimposed upon a high frequency carrier wave in the balanced modulator 85 which is supplied with the carrier from local oscillator 86. The output of the balanced modulator 85 is fed through a series of eighty channels including the patch panel 21 to the mixer 88. Each channel consists of a bandpass filter 89, coupled through patch panel 21 to an automatic gain control (AGC) amplifier 90 and from the AGC amplifier 90 back through the patch panel 21 to the mixer.

The mixer output is supplied to a balanced demodulator and 2 kc. low pass filter 91 where it is subjected to heterodyne detection by combining with the output of the oscillator 86. The detected signal is used to control the operation of the system 92. Further details of the foregoing circuit are fully explained in the aforementioned co-pending patent application.

A vibration exciter (not shown) constitutes the means in the system 92 for imparting vibration to a specimen. At the same time the motion of the exciter is mechanically communicated to an accelerometer 93 whose output is supplied to the balanced modulator 94. The carrier wave from the local oscillator 86 is supplied to modulator 94 where it is combined with the signal from accelerometer 93. The modulated signal is then supplied to eighty feedback channels, each consisting of a bandpass filter 95, an amplifier 96, one of the adjustable attenuators in the panel 20, a buffer amplifier 97, and an automatic gain control (AGC) detector 98. The output of the AGC detector 98 is coupled to control the gain in the corresponding AGC amplifier 90.

The relationship between FIGS. 2 and 9 should now be apparent. Sub-assembly 34 in FIG. 2 may house the mixer 88 of FIG. 9. Similarly, sub-assembly 35 houses the bandpass filters such as 89. Sub-assembly 36 houses the AGC amplifiers, the AGC detectors, and the buffer amplifiers, such as elements 90, 98 and 97. Finally, sub-assembly 37 houses the amplifiers such as 96.

When the plug-in units 20 and 21 are changed from the position shown in FIGS. 1, 2 and 9 to the position shown in FIG. 8, the circuit connections will be as shown in FIG. 10. By comparing FIG. 10 with FIG. 9 several differences can be noted. The patch panel now serves no purpose other than to occupy the lower receptacle in the chassis 22 and protect the sockets associated with the buffer amplifiers 97 and amplifiers 96. The plugs in row 40 engage the sockets in row 51, but this serves only to ground the patch panel.

The attenuator panel 20 is now inverted so as to cause mercury switch 73 to close and shunt resistor 72. To compensate in part for the increased output from the attenuator and in part for the different level of circuit operation, the slider output is now connected to the mixer through voltage dropping resistor 76. In the automatic mode as shown in FIG. 9, the slider 63 is connected directly to the mixer through an alternative connection.

From FIG. 10 it will be observed that the output of the random noise generator, after being superimposed on the carrier in modulator 85, is fed through the eighty channels to the mixer 88. Each channel now comprises a bandpass filter such as 89 and an attenuator in panel 20.

Referring now to FIG. 8, a typical set-up is shown on the attenuator panel for equalizing a system as explained more fully in the aforementioned copending application. Dotted lines have been inserted between the indicators to clarify the visual representation but do not appear on the actual structure.

As seen in FIGS. 1 and 8 the front of the patch panel 21 is provided with two block diagrams 99 and 100 to represent, respectively, the general circuit configuration prevailing in the automatic and manual positions.

From the foregoing it will be apparent that there has been provided an arrangement of plug-in units adapted to interconnect selectably a plurality of electrical circuit components in a number of different operating modes. It should be understood that changes can be made in the details of construction without departing from the true spirit of the invention as defined in the appended claims.

What is claimed is:

1. Electrical apparatus comprising
   (a) a plurality of electrical circuit components, and
   (b) means for selectably interconnecting said components into at least two different circuit arrangements representing different modes of operation, said means including
      (i) plug-receiving contact means connected to certain of said components,
      (ii) a plug-in unit having mating contacts for engaging at least certain of said plug-receiving contact means, and
      (iii) at least one further electrical component in the form of an adjustable circuit means carried by said plug-in unit and connected to said mating contacts, said plug-receiving contact means and said plug-in unit being constructed and arranged such that such plug-in unit plugs into said plug-receiving contact means in at least two different positions of orientation, each position establishing a different one of said circuit arrangements.

2. Electrical apparatus according to claim 1, wherein said plug-receiving contact means are divided between a plurality of receptacles for a plug-in unit with at least two of such contact means associated with each receptacle, and said plug-in unit is arranged for plugging selectably into any one of said receptacles to engage the contact means therein, said receptacles and plug-in unit having cooperating means for positioning said unit in a different orientation relative to each receptacle.

3. Electrical apparatus according to claim 2, wherein said adjustable circuit means comprises an indicator for indicating the state of its adjustment, said indicator being readable in like manner and with equal facility for all of said positions of orientation of the plug-in unit.

4. Electrical apparatus according to claim 3, wherein said plug-in unit has only two positions of orientation, one the inverse of the other such that the electrical function of the adjustable circuit means is inverted from one position to the other while the manner of reading the indicator remains the same.

5. Electrical apparatus according to claim 1, wherein said plug-receiving contact means are divided between two receptacles for a plug-in unit with at least two of such contact means associated with each of said receptacles, said plug-in unit is arranged for plugging selectably into one or the other of said receptacles to engage at least certain of the contact means therein, said receptacles and plug-in unit having cooperating means for positioning said unit in a different orientation relative to each receptacle with one orientation being the inverse of the other, and wherein a second plug-in unit is provided comprising mating contacts for engaging said plug-receiving contacts and circuit inter-connecting means connected between said mating contacts, said second unit being arranged to plug into whichever receptacle is free of the first unit and to engage at least certain of the contact means therein and interconnect certain of said circuit components at least when plugged into a predetermined one of said receptacles.

6. Electrical apparatus according to claim 1, wherein said plug-in unit has only two positions of orientation, one the inverse of the other, and comprises a position sensitive switch coupled to said adjustable circuit means for altering the operation thereof responsive to opening and closing of said switch, said switch being disposed for opening in one of said positions of orientation and for closing in the inverse position.

7. Electrical apparatus according to claim 6, wherein said adjustable circuit means comprises a potentiometric device and a fixed impedance, said potentiometric device having an input and an output both including said fixed impedance in series therewith, said fixed impedance being shunted by said switch, whereby said adjustable circuit means is adjustable between a maximum value and a minimum value other than zero when said unit occupies said one position of orientation and is adjustable between maximum and zero when said unit occupies said inverse position.

8. Electrical apparatus according to claim 7, wherein said plug-in unit comprises a front panel and said potentiometric device is provided with at least an indicator in the form of a member protruding through an elongated linear slot in said front panel and movable along said slot for indicating the state of adjustment of said potentiometric device, and bi-directional indicia associated with said slot such that said indicator is readable in the same manner and with equal facility for both orientations of said unit, the relationship between the electrical function of the adjustable circuit means and the indicia being inverted with inversion of the plug-in unit.

9. Electrical apparatus according to claim 1, wherein said adjustable circuit means comprises an indicator for indicating the state of its adjustment, said indicator being readable in like manner and with equal facility for all of said positions of orientation of the plug-in unit.

10. Electrical apparatus according to claim 9, wherein said plug-in unit has only two positions of orientation, one the inverse of the other such that the electrical function of the adjustable circuit means is inverted from one position to the other while the manner of reading the indicator remains the same.

11. Electrical apparatus according to claim 10, wherein said plug-in unit comprises a position sensitive switch coupled to said adjustable circuit means for altering the operation thereof responsive to opening and closing of said switch, said switch being disposed for opening in one position of orientation of said unit and for closing in the inverse position.

12. Electrical apparatus according to claim 1, wherein said plug-in unit comprises a front panel and said adjustable circuit means is provided with at least an indicator in the form of a member protruding through an elongated linear slot in said front panel and movable along said slot for indicating the state of adjustment of said adjustable circuit means, and bi-directional indicia associated with said slot such that said indicator is readable in the same manner and with equal facility for two orientations of said unit one being the inverse of the other such that the relationship between the electrical function of the adjustable circuit means and the indicia is inverted with inversion of the plug-in unit.

13. Electrical apparatus according to claim 12, wherein said protruding member is the actuating element for adjusting said adjustable circuit means.

References Cited by the Examiner
UNITED STATES PATENTS

| 1,754,645 | 4/30 | Oswald | 310—71 X |
| 1,921,608 | 8/33 | Dannheiser | 317—99 X |
| 2,321,999 | 6/43 | Dalton | 307—149 |
| 2,872,624 | 2/59 | Belek et al. | 317—99 |

LLOYD McCOLLUM, *Primary Examiner.*

MILTON O. HIRSHFIELD, *Examiner.*